US005766566A

United States Patent [19]

Mattila et al.

[11] Patent Number: 5,766,566
[45] Date of Patent: Jun. 16, 1998

[54] PROCESS FOR PREPARING FERRIC SULFATE

[75] Inventors: Harri Mattila, Ulvila, Finland; Timo Kenakkala, Rydebäck, Sweden; Olli Konstari, Pori, Finland

[73] Assignees: Kemira Pigments Oy; Kemira Chemicals Oy, both of Helsinka, Finland

[21] Appl. No.: 687,539

[22] PCT Filed: Feb. 2, 1995

[86] PCT No.: PCT/FI95/00045

§ 371 Date: Aug. 2, 1996

§ 102(e) Date: Aug. 2, 1996

[87] PCT Pub. No.: WO95/21128

PCT Pub. Date: Aug. 10, 1995

[30] Foreign Application Priority Data

Feb. 3, 1994 [FI] Finland ................................. 940511

[51] Int. Cl.$^6$ .................................................. C01G 49/14
[52] U.S. Cl. .................................. 423/558; 423/146
[58] Field of Search ............................ 423/146, 558, 423/DIG. 2

[56] References Cited

U.S. PATENT DOCUMENTS

| 1,636,296 | 7/1927 | Elliott | 423/558 |
| 1,880,265 | 10/1932 | Marsh et al. | 423/558 |
| 4,707,349 | 11/1987 | Hjersted | 423/558 |
| 5,194,241 | 3/1993 | Derka | 423/558 |

FOREIGN PATENT DOCUMENTS

| 2834460 | 2/1980 | Germany | 423/558 |
| 1 253 484 | 11/1971 | United Kingdom. | |
| 2 125 020 | 2/1984 | United Kingdom. | |

Primary Examiner—Gary P. Straub
Assistant Examiner—Timothy C. Vanoy
Attorney, Agent, or Firm—Gary A. Nath; Nath & Associates

[57] ABSTRACT

The invention relates to a process of preparing ferric sulfate by forming a slurry which contains ferrous sulfate and sulfuric acid, the slurry containing bivalent iron in both the solution phase and the solid phase, and by oxidizing this slurry to form a ferric sulfate slurry. When so desired, the obtained ferric sulfate slurry is solidified to form solid ferric sulfate. The obtained ferric sulfate may, as such or dissolved in water, be used for the treatment of waste waters or for preparing pure tap water.

13 Claims, No Drawings

PROCESS FOR PREPARING FERRIC SULFATE

This application is a national stage filing under 35 U.S.C. § 371 of PCT/FI95/00045 filed 2 Feb. 1995.

The present invention relates to a process of preparing ferric sulfate by oxidation from ferrous sulfate and sulfuric acid. The invention also relates to the use of ferric sulfate prepared according to the invention for the treatment of waste waters, for the preparation of pure tap water, and for other purposes of precipitating or removing impurities.

Ferrous sulfate is formed in large quantities as side streams of various processes in the world. One important producer of ferrous sulfate is the industry which prepares titanium dioxide by the sulfate method and uses ilmenite as its raw material. Significant amounts of ferrous sulfate are used for the treatment of waste waters, and the treatment of waste waters will increase worldwide. It is, however, known that ferric sulfate is more effective than ferrous sulfate in the treatment of waste waters and has indeed in part replaced the use of ferrous sulfate.

A process is known in which a solution is prepared from ferrous sulfate, sulfuric acid, and water, and the solution is further oxidized to a ferric sulfate solution by using nitric acid, oxygen, or hydrogen peroxide. These processes have the disadvantage that the concentration of iron in the ferric sulfate solution is disadvantageously low, thus requiring immoderately large storage containers and causing high transportation costs. Such a method is known from U.S. Pat. No. 4,707,349, in which a ferrous sulfate solution which contains sulfuric acid is oxidized in two steps, first with oxygen and then with hydrogen peroxide, to form a ferric sulfate solution.

Also known are processes according to which the ferric sulfate solution is solidified by granulation or by other solidification methods, which always involve evaporation of the water.

However, these processes have the disadvantage that, owing to the low concentration of iron in the ferric sulfate solution, the obtaining of solid ferric sulfate requires the evaporation of immoderate quantities of water, which is uneconomical in terms of energy.

From GB patent publication 2 125 020 there is also known a process in which solid ferric sulfate is produced from ferrous sulfate and sulfuric acid by oxidizing the mixture at a high temperature in solid state at normal pressure. However, this process has the disadvantage that, owing to the high temperatures, the obtained solid ferric sulfate contains considerable amounts of water-insoluble compounds, which thus lower the concentration of active iron moles in the product, or their activation requires an extra addition of acid.

The object of the present invention is to provide a process by which a solid, highly water-soluble ferric sulfate can be prepared economically in terms of energy, storage and transportation.

The main characteristics of the invention are given in the accompanying claims.

In determining the dependence of the rate of oxidation of bivalent iron on the total concentration of iron in the solution/slurry it was found, surprisingly, that even though a significant proportion of the bivalent iron is in solid state in the initial step of the oxidation, this does not lengthen the total oxidation time to a significant degree. This is assumed to be due to the fact that, as bivalent iron oxidizes to trivalent iron, the total solubility of iron increases, which further enables more bivalent iron to dissolve to replace the oxidized iron, until there is no bivalent iron left in the solid phase. Respectively, as the concentration of trivalent iron increases, a portion of it begins to crystallize out from the solution at the stage when the concentration of trivalent iron exceeds the saturation concentration. Thus, when a slurry which contained both solid and dissolved ferrous sulfate was fed into the oxidation reactor, a slurry was obtained which contained both solid and dissolved ferric sulfate. The solidification of such a slurry can be conducted advantageously by cooling, by means of a plate granulator, by means of a drum granulator, or by any other corresponding method.

According to the invention, the slurry to be oxidized may be formed from ferrous sulfate and sulfuric acid, and possibly moisture. According to the invention, it is also possible to form the slurry to be oxidized from a ferrous sulfate which contains sulfuric acid in an amount of 0–15% by weight, and possibly from sulfuric acid and moisture. Such a ferrous sulfate which contains sulfuric acid can be obtained from the waste acid formed in the preparation of titanium dioxide.

The ferrous sulfate used may contain water of crystallization, and it may, for example, be ferrous sulfate monohydrate, ferrous sulfate tetrahydrate, or ferrous sulfate heptahydrate.

The molar ratio of iron to sulfate in the slurry to be oxidized is preferably 2:(2.0–3.5).

The concentration of iron in the ferrous sulfate used is preferably 14–32% by weight.

The sulfuric acid used is preferably sulfuric acid having a sulfuric acid concentration of 22–100% by weight, or oleum having an $SO_3$ concentration of 0–30% by weight.

The iron concentration of the ferric sulfate slurry obtained is, after oxidation, preferably 14–24% by weight.

The oxidation is preferably performed by using molecular oxygen, at a temperature of 60°–140° C. and at overpressure, for example an overpressure of 3–10 bar.

The molar ratio of iron to sulfate in the obtained ferric sulfate slurry is preferably 2:(2.5–3.5).

The concentration of iron in the obtained solid ferric sulfate is preferably 16–30% by weight.

EXAMPLE 1

4000 kg of ferrous sulfate monohydrate (iron concentration 32% by weight) and 1165 kg of a 96% sulfuric acid were batched into a pressure reactor and were heated to 120° C. The reactor was pressurized by means of oxygen to an overpressure of 3 bar. The temperature of the slurry was maintained at 120° C. and the overpressure at 3 bar, and the mixture was stirred effectively in order to promote the dispersion of oxygen, until the concentration of bivalent iron was less than 0.1% by weight.

The produced ferric sulfate slurry, the iron concentration of which was 23.9% by weight, was solidified by cooling. The proportion of water-insoluble material in the solid ferric sulfate was less than 0.2% by weight of the total mass.

EXAMPLE 2

5000 kg of ferrous sulfate heptahydrate (iron concentration 16.5% by weight) and 770 kg of a 93% sulfuric acid were batched into a pressure reactor and were heated to 60° C. The reactor was pressurized by means of oxygen to an overpressure of 10 bar. The temperature of the slurry was maintained at 60° C. and the pressure at 10 bar, until the concentration of bivalent iron was less than 0.1% by weight.

The produced ferric sulfate slurry, Fe 14% by weight, was granulated by using a Spherodizer-type granulation drum. The concentration of iron in the produced granules was 18% by weight, and the proportion of water-insoluble material was less than 0.2% by weight of the total mass.

The functioning of the products of both examples was tested at a municipal waste water treatment plant.

We claim:

1. A process for preparing ferric sulfate which comprises:
   (a) forming a slurry containing ferrous sulfate and sulfuric acid, wherein the slurry contains bivalent iron in both solution phase and solid phase; and
   (b) oxidizing the slurry to form a ferric sulfate slurry with a molecular oxygen oxidizing agent at a pressure greater than atmospheric pressure and at a temperature of 60°–140° C., wherein all of the solid phase bivalent iron gradually passes into the solution phase during the oxidation of the slurry, so that a reaction occurs between the bivalent iron in solution phase and the molecular oxygen oxidizing agent to form an aqueous slurry of both solution and solid phase ferric sulfate.

2. A process according to claim 1, further comprising the step of cooling the ferric sulfate slurry or evaporating the water out of the ferric sulfate slurry to promote the formation of solid ferric sulfate.

3. A process according to claim 2, wherein the solid ferric sulfate has an iron concentration of 16–30% by weight.

4. A process according to claim 1, wherein the slurry to be oxidized is formed from ferrous sulfate and an aqueous solution of sulfuric acid.

5. A process according to claim 4, wherein said ferrous sulfate may contain sulfuric acid in an amount of 0–15% by weight.

6. A process according to claim 1, wherein the ferrous sulfate is a ferrous sulfate hydrate.

7. A process according to claim 6, wherein the ferrous sulfate hydrate is selected from the group consisting of ferrous sulfate monohydrate, ferrous sulfate tetrahydrate, and ferrous sulfate heptahydrate.

8. A process according to claim 1, wherein the slurry to be oxidized has an iron to sulfate molar ratio of 2:(2.0–3.5).

9. A process according to claim 1, wherein the ferrous sulfate has an iron concentration of 14–32% by weight.

10. A process according to claim 1, wherein the sulfuric acid is a sulfuric acid having a sulfuric acid concentration of 22–100% by weight or oleum having an $SO_3$ concentration of 0–30% by weight.

11. A process according to claim 1, wherein the ferric sulfate slurry has an iron concentration of 14–24% by weight after oxidation.

12. A process according to claim 1, wherein the ferric sulfate slurry has an iron to sulfate molar ratio of 2:(2.5–3.5).

13. A process according to claim 1, wherein the pressure is 3–10 bar.

* * * * *